United States Patent [19]
Linker et al.

[11] Patent Number: 6,079,600
[45] Date of Patent: Jun. 27, 2000

[54] BASKET ASSEMBLY FOR GOLF BAG CARTS

[76] Inventors: Harold Frederick Linker; Kevin Lane Linker, both of P.O. Box 14418, Albuquerque, N. Mex. 87191-4418

[21] Appl. No.: 09/299,581

[22] Filed: Apr. 27, 1999

Related U.S. Application Data

[60] Provisional application No. 60/083,233, Apr. 27, 1998.
[51] Int. Cl.[7] ....................... B60R 9/00
[52] U.S. Cl. ................ 224/274; 224/412; 224/419; 224/420; 224/433; 224/434
[58] Field of Search ................... 224/274, 411, 224/412, 413, 414, 419, 420, 421, 425, 434, 918, 409, 430, 433, 431; 280/DIG. 5, DIG. 6; 248/96; D34/15; 206/315.3

[56] References Cited

U.S. PATENT DOCUMENTS

| | | |
|---|---|---|
| 595,240 | 12/1897 | Lincoln . |
| 767,823 | 8/1904 | Lederman . |
| 3,311,277 | 3/1967 | Gordon ................... 224/431 |
| 4,056,219 | 11/1977 | Hine, Jr. . |
| 4,282,993 | 8/1981 | Humlong ................. 224/431 |
| 4,440,332 | 4/1984 | Kullen . |
| 4,666,071 | 5/1987 | Irwin et al. . |
| 4,730,758 | 3/1988 | McMurtrey . |

*Primary Examiner*—Gregory M. Vidovich
*Assistant Examiner*—Maerena W. Brevard
*Attorney, Agent, or Firm*—Stephen R. Greiner

[57] ABSTRACT

An improved basket assembly includes a supporting bracket for mounting on a motorcaddy used by golfers to transport their clubs around a golf course and a basket releasably secured to the bracket. The bracket has a pair of arms extending from its upper end whose ends are provided with axially aligned openings for receiving a threaded fastener for attachment to the motorcaddy. The basket has a handle with portions which serve to secure the basket to the bracket. These portions have a particular angular relationship which accommodates parts of the motorcaddy which tend to project directly above the basket itself.

9 Claims, 4 Drawing Sheets

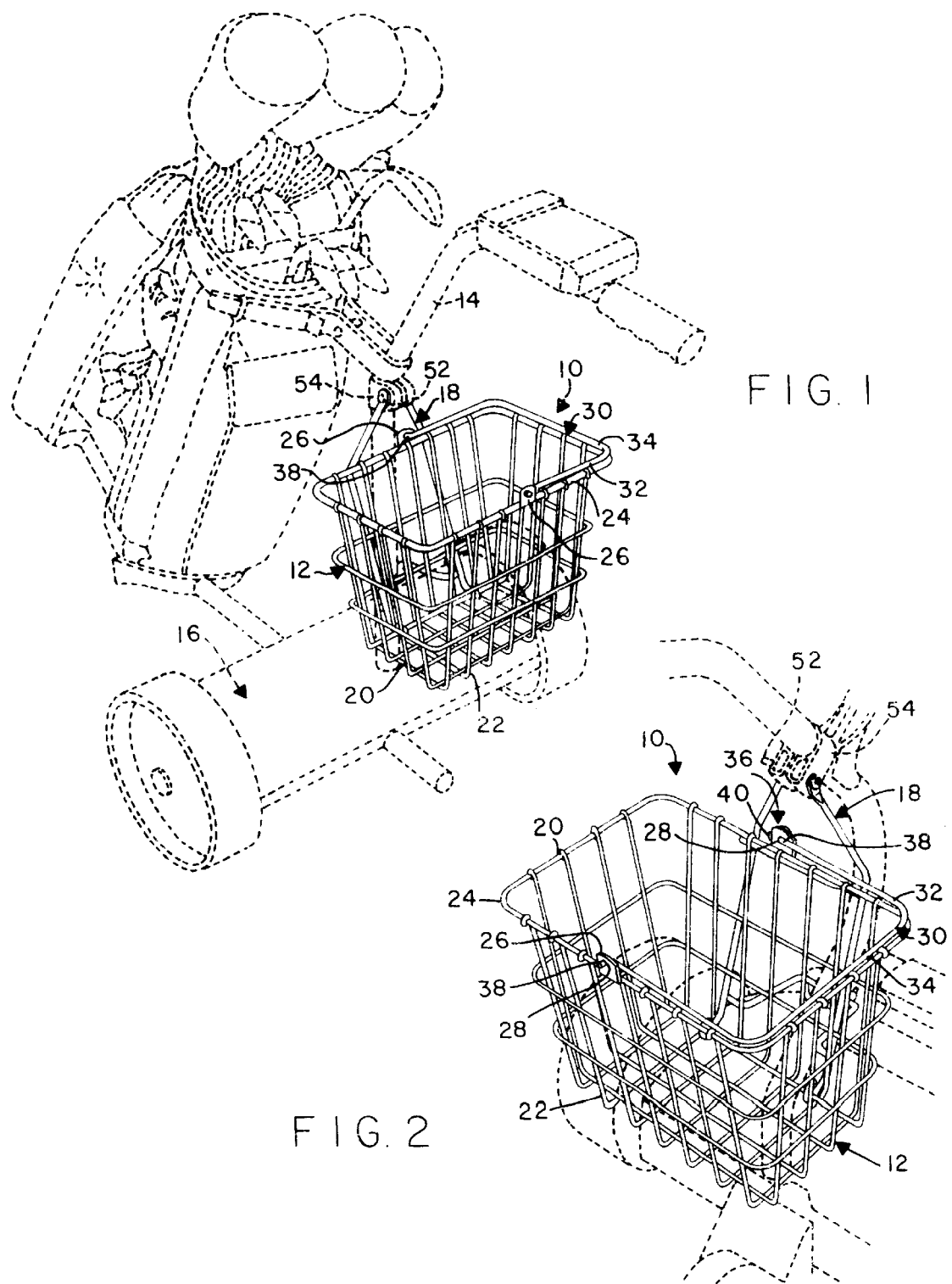

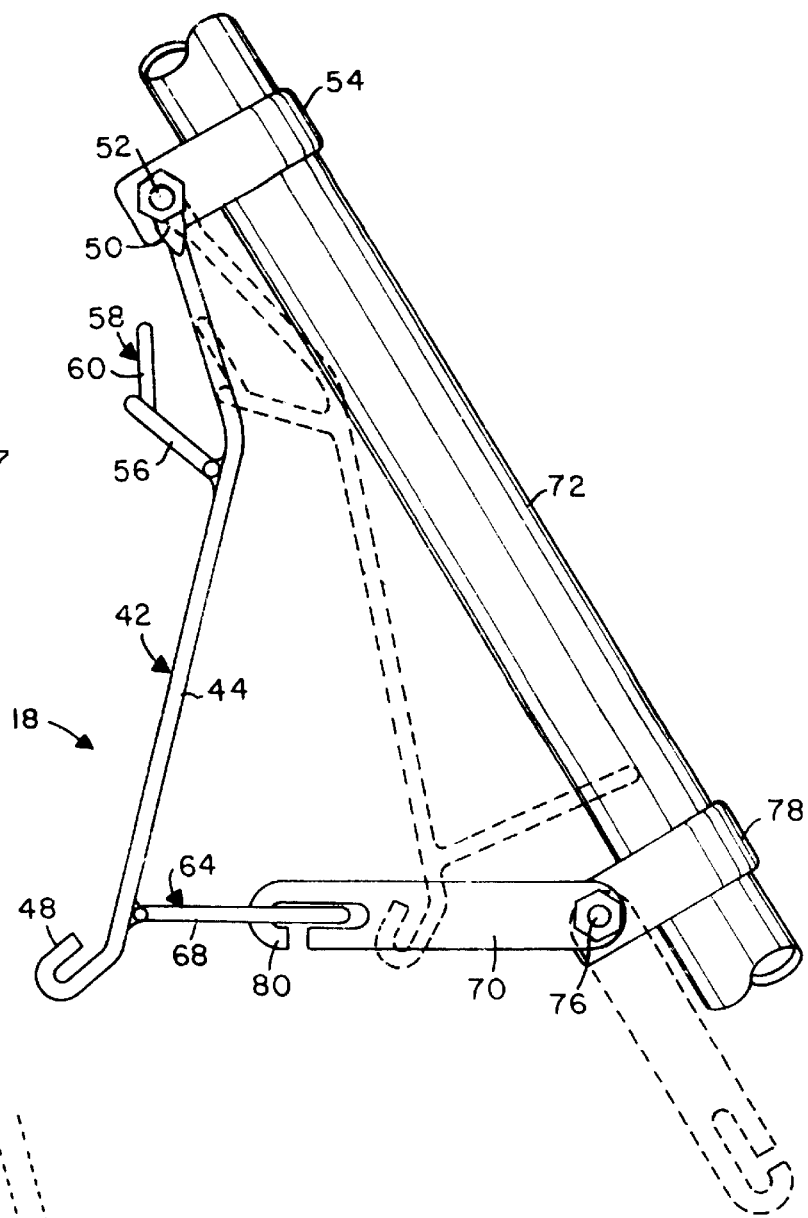
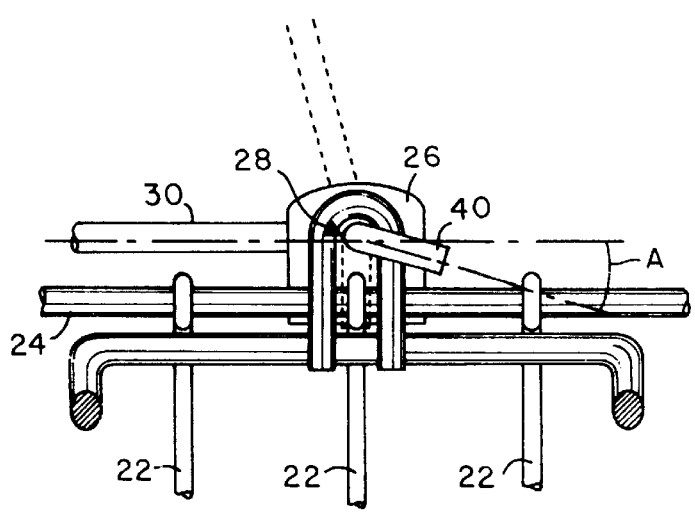

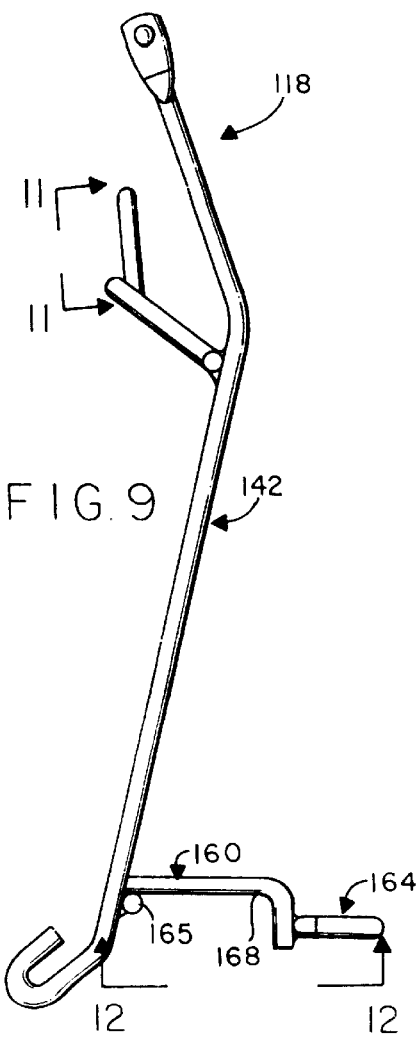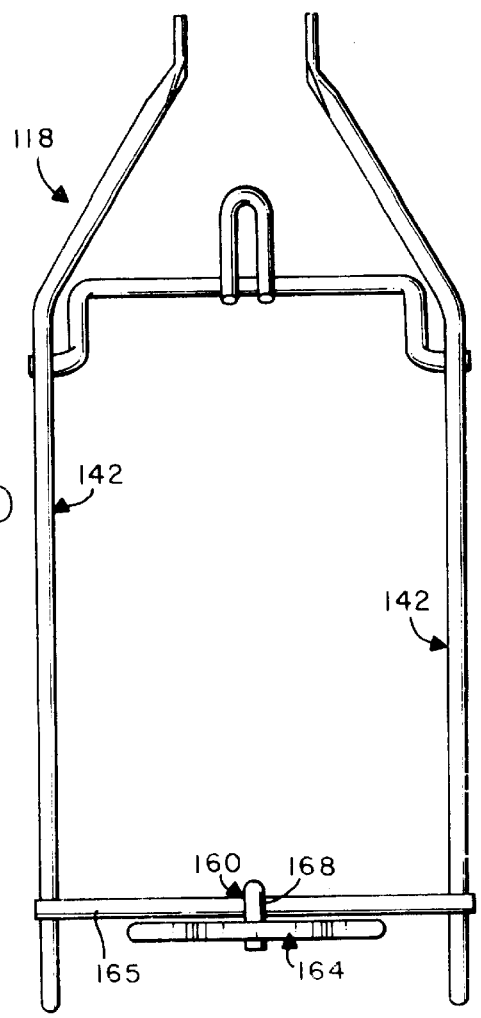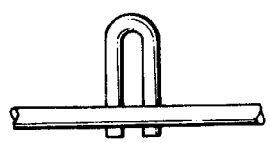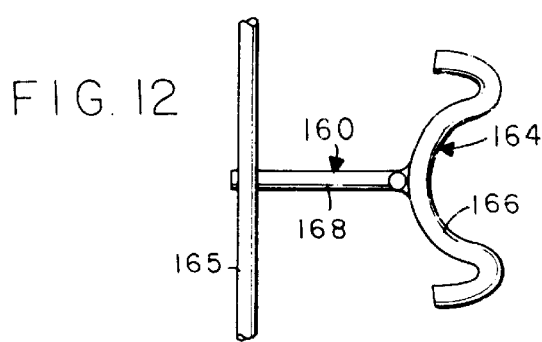

BASKET ASSEMBLY FOR GOLF BAG CARTS

CLAIM OF PRIORITY UNDER 35 U.S.C. 119(e)

In determining the effective filing date of this specification, applicants claim priority under 35 U.S.C. 119(e) from their provisional application Ser. No. 60/083,233, filed Apr. 27, 1998.

FIELD OF THE INVENTION

The present invention relates generally to vehicle-attached, article carriers and, in particular, to means for mounting such a carrier to a golf bag cart.

BACKGROUND OF THE INVENTION

Self-propelled carts or "motorcaddies" have long been used by golfers to tote their club-filled bags while golfing. Today, several manufacturers make and sell motorcaddies. While motorcaddy accessories such as seats and drink holders are available from these manufacturers, baskets for carrying bulkier items like: jackets, hats, drinks, food, cell phones, gloves, sunglasses and sunscreen are not available for purchase.

Perhaps the reason that baskets are not offered by motorcaddy manufacturers is that their motorcaddies are usually transported to golf courses for use in the trunks of automobiles where space is limited. By permanently attaching a basket of utilitarian size to a motorcaddy, such will be prevented from fitting into an automobile trunk. Until now, no one involved with motorcaddies has overcome this obstacle.

In a related field, some have recognized the need for baskets that can be detached from bicycles for easy storage and have proposed a few designs. One design in particular, shown in U.S. Pat. No. 4,730,758, provides many of the features needed in a detachable basket for motorcaddies. Nonetheless, its handlebar-engaging support does not lend itself to a secure attachment to a motorcaddy. Furthermore, the handle of the basket must be modified to function properly adjacent a motorcaddy frame.

SUMMARY OF THE INVENTION

In light of the problems associated with permanently attaching a basket to a motorcaddy, it is a principal object of the invention to provide a basket assembly with a detachable basket that may be sturdily mounted upon a motorcaddy to transport a variety of items yet may be quickly and easily detached when necessary. The detached basket may be carried by a golfer into his home, garage, locker room, or automobile for loading or unloading.

It is another object of the invention to provide a basket assembly of the type described that can be readily incorporated into motorcaddies at the time of their construction or added thereto as an aftermarket product. With slight modifications, the basket assembly can be mounted on all known brands and models of motorcaddies like: Minn Kota, ClubRunner, Lectronic Kaddy, RoboKaddy and PowaKaddy.

It is a further object of the invention to provide a basket assembly that can be mounted on a motorcaddy by one with minimal mechanical aptitude and few tools.

It is an object of the invention to provide improved elements and arrangements thereof in a basket assembly for the purposes described which is lightweight in construction, inexpensive to manufacture, and dependable in use.

Briefly, the basket assembly in accordance with this invention achieves the intended objects by featuring a basket and a supporting bracket. The bracket has a pair of laterally spaced members each having a lower segment, with a hook at its bottom, angularly joined to an upper segment with an apertured flange at its top. A U-shaped brace extends between the laterally spaced members adjacent the connections between the lower and upper segments and carries a slotted locking member. An M-shaped brace extends between the laterally spaced members adjacent the hooks and is adapted to engage the motorcaddy. The basket has openwork bottom and side walls. A handle is pivotally connected to the basket and has an offset elongated leg oriented at an angle to the handle side portions. The leg is insertable through the slotted locking member with the handle in an inclination from vertical. The elongated leg is also movable to a substantially horizontal position to lock the handle to the bracket.

The foregoing and other objects, features and advantages of the present invention will become readily apparent upon further review of the following detailed description of the preferred embodiments as illustrated in the accompanying drawings.

BRIEF DESCRIPTION OF THE DRAWINGS

The present invention may be more readily described with reference to the accompanying drawings, in which:

FIG. 1 is a perspective view of a basket assembly in accordance with the present invention mounted on a golf bag cart.

FIG. 2 is an enlarged perspective view of the basket assembly of FIG. 1 shown mounted on another type of golf bag cart.

FIG. 7 is a side view showing the pivoting mount of the supporting bracket of FIG. 3 on a upright of a golf bag cart.

FIG. 8 is a side view of a portion of the basket of the basket assembly of FIG. 1 showing details thereof.

FIG. 9 is a side view of an alternative supporting bracket.

FIG. 10 is a front view of the supporting bracket of FIG. 7.

FIG. 11 is a view showing details of the supporting bracket taken along line 11—11 of FIG. 9.

FIG. 12 is a view showing details of the supporting bracket taken along line 12—12 of FIG. 9.

Similar reference characters denote corresponding features consistently throughout the accompanying drawings.

DETAILED DESCRIPTION OF THE PREFERRED EMBODIMENTS

Figure 3:
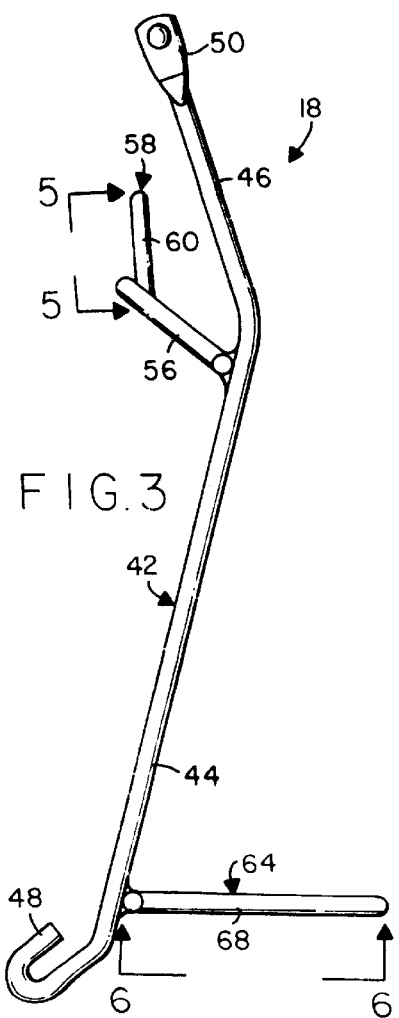
FIG. 3 is a side view of the preferred supporting bracket forming part of the basket assembly of FIG. 1.
Figure 4:
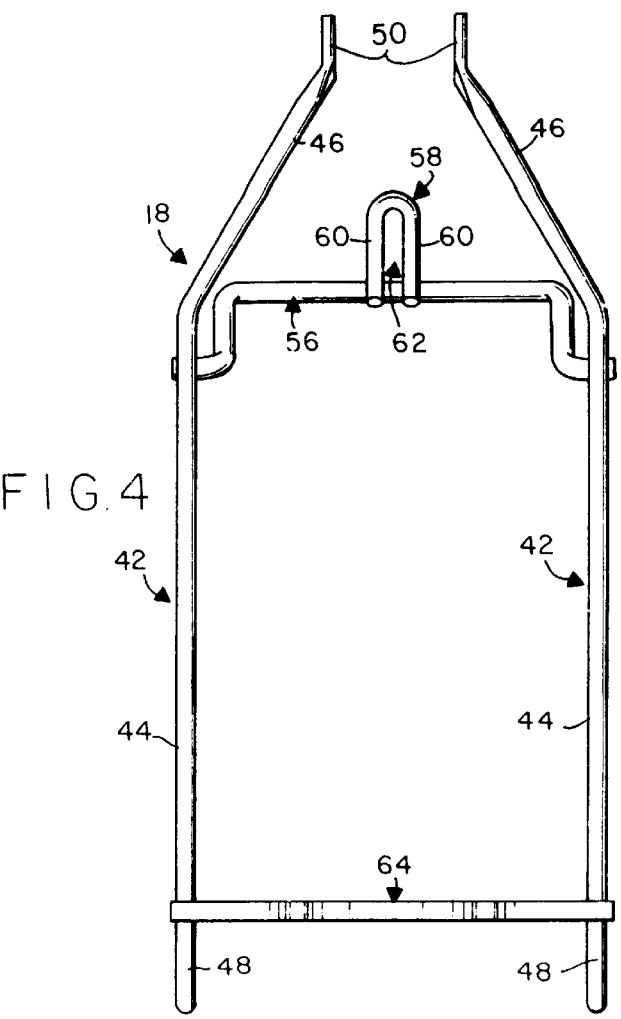
FIG. 4 is a front view of the supporting bracket of FIG. 3.
Figure 5:
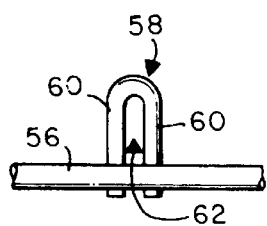
FIG. 5 is a view showing details of the supporting bracket taken along line 5—5 of FIG. 3.
Figure 6:
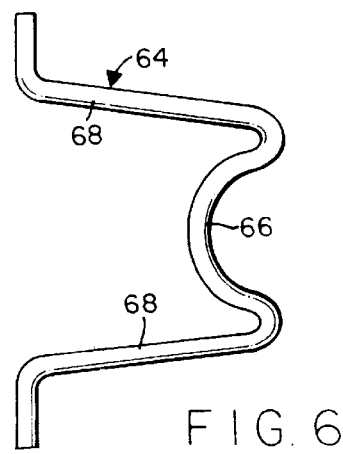
FIG. 6 is a view showing details of the supporting bracket taken along line 6—6 of FIG. 3.

Referring now to FIGS. 1–8, a basket assembly in accordance with the present invention is shown at 10. The basket assembly 10 includes a basket 12 releasably secured to the upright member 14 of a motorcaddy 16 by a supporting bracket 18. Since much of the basket 12 and bracket 18 are shown in U.S. Pat. No. 4,730,758 issued Mar. 15, 1988, to David K. McMurtrey, their description will not be belabored here. Instead, we will focus our narrative on improvements to the apparatus in the '758 patent which we hereby incorporate for all purposes herein.

The basket 12 is formed from a plurality of U-shaped wires 20 and 22 which are joined together to form an openwork box with an uncovered top. For rigidity, the upper ends of the wires 20 and 22 are affixed to a top perimeter wire 24. A pair of clips 26, each having a bore 28, are affixed to the wire 24 on opposite sides of the basket 12. A handle 30 is pivotally secured by the clips 26 to the remainder of the basket 12.

The handle 30 includes a pair of side portions 32 joined by a cross portion 34 in a "U" shape. At least one of the side portions 32 has an L-shaped end 36 with an inner, short leg 38 and an outer, elongated leg 40. The legs 38 are joined at right angles to the side portions 32 and extend outwardly through the bores 28 which they are adapted to rotate within. Leg 40, on the other hand, is joined at right angles to the outer end of the leg 38. As shown in FIG. 8, the longitudinal axis of leg 40 is oriented at an acute angle "A" of about fifteen degrees to the longitudinal axes of side portions 32.

The supporting bracket 18 includes a pair of laterally spaced members 42 each having a lower segment 44 angularly joined to an upper segment 46. As shown, the lower segments 44 are positioned parallel to one another and are each provided with a forwardly-facing hook 48 at its bottom. The upper segments 44, however, extend forwardly and inwardly from the lower segments 44 toward one another. The tops of the upper segments 44 are provided with a pair of parallel, apertured flanges 50 through which a threaded fastener 52 may be extended to connect the upper end of the bracket 18 to a C-clamp 54 encircling the upright 14 of motorcaddy 16.

The members 42 are joined at the junctions of their lower and upper segments 44 and 46 by a U-shaped brace 56. The brace 56 extends upwardly and forwardly from the members 42 to which its opposed ends are affixed.

A U-shaped, locking member 58 extends upwardly and forwardly from the U-shaped brace 56. Preferably, the opposed ends of the locking member 58 are affixed to the center of the brace 56. The locking member 58 has a pair of closely spaced legs 60 which define a vertical slot 62 for selectively receiving the elongated leg 40 of handle 30.

Adjacent the hooks 48, the bottoms of the lower segments 44 are joined together by an M-shaped brace 64. The brace 64 has an arcuate center section 66 for engaging the upright 14 of motorcaddy 16 and a pair of legs 68 extending therefrom. The legs 68 extend forwardly and downwardly from the center section 66 and their free ends are affixed to the members 42.

A flexible tie (not shown) may be employed to retain the arcuate center section 66 in abutment with the upright 14 of the motorcaddy 16. The tie would be fastened to each of the legs 68 of the M-shaped brace 64 and caused to bridge the arcuate center section 66 with the upright 14 positioned therein. Removing all slack from the tie during fastening eliminates any possibility that the lower end of the bracket 18 will move relative to the motorcaddy 16 during use.

As an alternative to the tie, a swing arm 70 may be used as shown in FIG. 7 which permits the bracket 18 to be pivoted from a storage position adjacent upright 72 to basket-carrying position. The arm 70 includes a transverse aperture (not shown) at one of its ends through which a threaded fastener 76 may be extended to pivotally connect arm 70 to a C-clamp 78 encircling the upright 72. The opposite end of the arm 70 is provided with a hook 80 for selectively grasping the center section of brace 64.

Use of the basket assembly 10 is straightforward. First, the bracket 18 is mounted on the motorcaddy 16 by positioning the C-clamp 54 around upright 14 for example and extending fastener 52 through the apertured flanges 50 and C-clamp 54. The center section 66 of brace 64 is then positioned against upright 14 and fastened thereto by means of a tie if a fixed mount is desired or by means of swing arm 70 if a pivoting mount is desired.

Now, the bottom of basket 12 is positioned within hooks 48 and the top of basket 12 is locked in place by joining the L-shaped end 36 of handle 30 with the locking member 58. With the handle 30 in a near-vertical position, elongated leg 40 is aligned with slot 62. By moving the top of the basket 12 toward the bracket 18, the leg 40 enters and extends through the slot 62. The handle 30 is now rotated downwardly seventy-five degrees to a horizontal position against perimeter wire 24 to lock the basket 12 in place.

The basket 12 is removed from the bracket 18 by reversing the steps detailed above—a process that requires mere seconds to complete. When disengaged, the basket 12 may be lifted from the bracket 18 and carried away from the motorcaddy 16. The basket assembly 10, therefore, permits detachment and reattachment of the basket 12 to the bracket 18 with a minimum of effort, tools and time.

An alternative supporting bracket 118 which may be used with basket 12 is illustrated in FIGS. 9–12. Here, the supporting bracket 18 has been modified to: reduce its weight and the space it occupies which is of particular importance during transport and storage when attached to a motorcaddy. The bracket 118 is identical in all respects to bracket 18 except that the legs 68 have been clipped and replaced by a T-shaped strut 160.

The strut 160 has a cross piece 165 whose opposed ends are affixed to laterally spaced members 142. A stay 168 extends upwardly and rearwardly from the center of the cross piece 165. Secured to the free end of stay 168 is an M-shaped brace 164 having an arcuate center section 166 for engaging the upright of a motorcaddy.

While the preferred embodiments of the invention have been described with a high degree of particularity, it will be appreciated by those skilled in the art that modifications may be made thereto. Therefore, it is to be understood that the present invention is not limited to the several embodiments described above, but encompasses any and all embodiments within the scope of the following claims.

We claim:

1. A basket assembly, comprising:
   a supporting bracket including:
   a pair of laterally spaced members each having a lower segment, with a forwardly facing hook at its bottom, angularly joined to an upper segment with an apertured flange at its top, said lower segments being oriented parallel to one another, and said upper segments extending forwardly and inwardly toward one another from their connections to said lower segments;
   a U-shaped brace connected to and extending between said laterally spaced members adjacent the connections between said lower and upper segments thereof;
   a locking member connected to said U-shaped brace, said locking member having a slot formed therein; and,
   an M-shaped brace connected to, and extending between, said laterally spaced members, said M-shaped brace having an arcuate center section adapted to engage the motorcaddy;

a basket releasably attached to said supporting bracket, said basket including:
- a bottom wall and side walls extending upwardly from said bottom wall, said walls all being formed by spaced, U-shaped wires;
- a perimeter wire connected to the top of said U-shaped wires;
- a handle having a pair of side portions having upper and lower ends, said upper ends of said side portions being joined by a cross portion, said lower ends of said side portions being pivotally secured to said perimeter wire, one of said lower ends of said side portions having an offset elongated leg, said elongated leg being oriented at an acute angle to said side portions, said elongated leg also being insertable through said slot of said locking member with said handle in an inclination from vertical equivalent to said acute angle, and said elongated leg being movable perpendicularly to said slot upon movement of said handle to a horizontal position to lock said handle to said bracket.

2. The basket assembly according to claim 1 wherein said M-shaped brace is connected to said laterally spaced members by a pair of legs extending from opposite sides of said arcuate center section.

3. The basket assembly according to claim 1 further comprising:
- a C-clamp for engagement with the motorcaddy; and,
- a swing arm having opposed ends, one of said opposed ends being pivotally secured to said C-clamp, the other of said opposed ends having a retaining hook adapted for releasable engagement with said M-shaped brace.

4. The basket assembly according to claim 1 further comprising:
- a cross piece connected to, and extending between, said laterally spaced members adjacent said hooks
- a stay connected to, and extending rearwardly from, the center of said cross piece, said stay having a free end remote from said cross piece; and,
- said arcuate center section of said M-shaped brace being connected to said free end of said stay.

5. A supporting bracket for mounting a basket upon a motorcaddy, said supporting bracket comprising:
- a pair of laterally spaced members each having a lower segment, with a forwardly facing hook at its bottom, angularly joined to an upper segment with an apertured flange at its top, said lower segments being oriented parallel to one another, and said upper segments extending forwardly and inwardly toward one another from their connections to said lower segments;
- a U-shaped brace connected to and extending between said laterally spaced members adjacent the connections between said lower and upper segments thereof;
- a locking member connected to said U-shaped brace, said locking member having a slot formed therein; and,
- an M-shaped brace extending between said laterally spaced members adjacent said hooks, said M-shaped brace having an arcuate center section and a pair of legs extending from opposite sides of said arcuate center section each being connected, respectively, to one of said laterally spaced members.

6. The supporting bracket according to claim 5 further comprising:
- a C-clamp for engagement with said motorcaddy; and,
- a swing arm having opposed ends, one of said opposed ends being pivotally secured to said C-clamp, the other of said opposed ends having a retaining hook adapted for releasable engagement with said M-shaped brace.

7. In combination with the bracket of claim 5, a basket comprising:
- a bottom wall and side walls extending upwardly from said bottom wall, said walls all being formed by spaced, U-shaped wires;
- a perimeter wire connected to the top of said U-shaped wires;
- a handle having a pair of side portions having upper and lower ends, said upper ends of said side portions being joined by a cross portion, said lower ends of said side portions being pivotally secured to said perimeter wire, one of said lower ends of said side portions having an offset elongated leg, said elongated leg being oriented at an acute angle to said side portions, said elongated leg also being insertable through said slot of said locking member with said handle in an inclination from vertical equivalent to said acute angle, and said elongated leg being movable perpendicularly to said slot upon movement of said handle to a horizontal position to lock said handle to said bracket.

8. A supporting bracket for mounting a basket upon a motorcaddy, said supporting bracket comprising:
- a pair of laterally spaced members each having a lower segment, with a forwardly facing hook at its bottom, angularly joined to an upper segment with an apertured flange at its top, said lower segments being oriented parallel to one another, and said upper segments extending forwardly and inwardly toward one another from their connections to said lower segments;
- a U-shaped brace connected to and extending between said laterally spaced members adjacent the connections between said lower and upper segments thereof;
- a locking member connected to said U-shaped brace, said locking member having a slot formed therein;
- a cross piece connected to, and extending between, said laterally spaced members adjacent said hooks;
- a stay connected to, and extending rearwardly from, the center of said cross piece, said stay having a free end remote from said cross piece; and,
- an M-shaped brace having an arcuate center section for engagement with the motorcaddy, said arcuate center section being connected to said free end of said stay.

9. In combination with the bracket of claim 8, a basket comprising:
- a bottom wall and side walls extending upwardly from said bottom wall, said walls all being formed by spaced, U-shaped wires;
- a perimeter wire connected to the top of said U-shaped wires;
- a handle having a pair of side portions having upper and lower ends, said upper ends of said side portions being joined by a cross portion, said lower ends of said side portions being pivotally secured to said perimeter wire, one of said lower ends of said side portions having an offset elongated leg, said elongated leg being oriented at an acute angle to said side portions, said elongated leg also being insertable through said slot of said locking member with said handle in an inclination from vertical equivalent to said acute angle, and said elongated leg being movable perpendicularly to said slot upon movement of said handle to a horizontal position to lock said handle to said bracket.

* * * * *